United States Patent [19]

Kurahashi et al.

[11] 3,752,918

[45] Aug. 14, 1973

[54] AUTOMATIC CONTINUOUSLY VARIABLE VELOCITY FILM SCANNER

[75] Inventors: Koichiro Kurahashi; Masanori Nakada; Harunori Sato, all of Amagasaki; Koichi Nishimura; Masaaki Abe, both of Kyoto, all of Japan

[73] Assignee: Mitsubishi Denki Kabushiki Kaisha, Amagasaki-shi, Japan

[22] Filed: May 12, 1971

[21] Appl. No.: 142,474

[30] Foreign Application Priority Data

May 13, 1970 Japan .............................. 45/40816

[52] U.S. Cl. .......................... 178/7.2, 178/DIG. 28

[51] Int. Cl. ............................................ H04n 5/00

[58] Field of Search ...................... 178/7.2, DIG. 28, 178/6.7 A

[56] References Cited

UNITED STATES PATENTS 3,290,437 12/1966 Goldmark et al. ........... 178/DIG. 28

*Primary Examiner*—Benedict V. Safourek
*Assistant Examiner*—George G. Stellar
*Attorney*—Oblon, Fisher & Spivak

[57] ABSTRACT

An apparatus for reproducing stored video information, recorded on a continuously moving recording medium is disclosed. A flying spot for scanning the recording medium is deflected along a first line which is perpendicular to the direction of movement of the recording medium and is also deflected along a second line which is parallel to the direction of movement of the medium. The deflection along the second line permits control of the relative velocity of the moving recording medium with respect to the flying spot. As the result, it enables making stable reproductions of video informations, slow motion reproductions, still-reproductions, accelerated-motion reproductions and the like regardless of the velocity of the recording medium.

18 Claims, 6 Drawing Figures

Patented Aug. 14, 1973

3,752,918

4 Sheets-Sheet 1

INVENTORS
KOICHIRO KURAHASHI
MASANORI NAKADA
HARUNORI SATO
KOICHI NISHIMURA
MASAAKI ABE

BY Oblon, Fisher, & Spivak
ATTORNEYS

Patented Aug. 14, 1973 3,752,918

4 Sheets-Sheet 3

AUTOMATIC CONTINUOUSLY VARIABLE VELOCITY FILM SCANNER

BACKGROUND OF THE INVENTION

1. Field of the Invention

The present invention relates generally to an apparatus for reproducing video information recorded on a recording medium, and more particularly to an apparatus for reproducing video information and obtaining a stable reproduction of the video information from a continuously moving recording medium, regardless of its moving velocity.

2. Description of the Prior Art

It is known in the art of reproducing video information from a continuously moving recording medium that a flying spot scanner beam may be deflected along a line which traverses the direction of movement of a recording medium. This deflection is generally referred to as horizontal scanning. In such apparatuses, the scanning of the recording medium on a line which is parallel with the direction of movement of the recording medium, which is generally referred to as a vertical scanning, depends solely on the movement of the recording medium. In the conventional apparatus, it is customary that the video information obtained by scanning the recording medium is reproduced on a monitor TV, for example, a standard TV receiver. A recording medium that has a number of video information areas or frames along its direction of movement separated by spacing areas, for example, an optical film, has commonly been used.

In the apparatus, if the velocity of the recording medium is defined as $Vf$, and one field dimension which includes the length of one video information area or frame plus the length of one spacing area, is defined as $D$, the vertical scanning time $Tf$ required for scanning one field along the moving direction is represented by the following equation:

$$Tf = D/Vf \tag{1}$$

The number of fields Nf scanned per second is represented by the following equation:

$$Nf = 1/Tf = Vf/D \tag{2}$$

It is necessary to have a minimum number of field scans per second, No, for reproducing the video information on a standard TV receive without flicker. This number is shown by the following equation:

$$No = 60 \tag{3}$$

Thus, it is necessary to have the following relation when a standard TV receiver is employed to reproduce video information:

$$Nf = No \tag{4}$$

In other words, the recording media must be moved at a constant velocity as defined by the following equation:

$$Vf = No \times D \tag{5}$$

Accordingly, in the conventional apparatus, the number of fields reproduced per second is limited to about 60, and it is impossible to make a slow motion reproduction, a still reproduction, which is generally required in a conventional apparatus for reproducing video information, or to make a rapid or accelerated reproduction which greatly exceeds 60 fields per second.

SUMMARY OF THE INVENTION

It is therefore an object of the present invention to provide a new and improved apparatus for reproducing video information which can reproduce video information with stability, even if the moving velocity of the recording medium is changed.

Briefly, in accordance with the present invention, the foregoing and other objects are attained by the provision of an apparatus for reproducing video information including a recording medium continuously moving in a particular direction. The recording medium includes a number of stored video information areas or frames aligned along the direction of motion and a number of spacing areas separating each of the information frames. A first deflecting device is provided for deflecting a flying scanning spot along a first line which traverses the direction of motion of the recording medium. A second deflecting device is provided for deflecting the flying spot along a second line which is substantially parallel to the above mentioned direction of motion. A detecting means is included for generating a detecting signal which is proportional to the relative velocity of the recording medium with respect to the velocity of the flying spot along the second line. A comparing device is provided for generating a differential signal indicating the difference between the detecting signal and a reference signal. An output deflecting circuit is included for controlling the second deflecting device in accordance with the differential signal and for deflecting the flying spot along the second line at such speed that the differential signal becomes zero.

BRIEF DESCRIPTION OF THE DRAWINGS

A more complete appreciation of the invention will be readily obtained as the same becomes better understood by reference to the following detailed description when considered in connection with the accompanying drawings, wherein.

DESCRIPTION OF THE PREFERRED EMBODIMENTS

Figure 1:
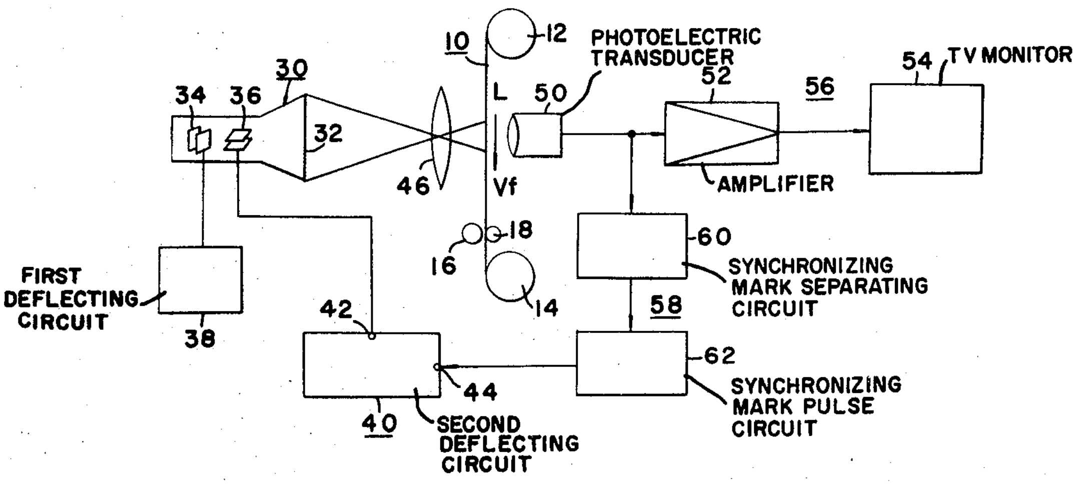
FIG. 1 is a schematic block diagram of one preferred embodiment of an apparatus for reproducing video information in accordance with the present invention.

Referring now to the drawings, wherein like reference numerals designate identical, or corresponding parts throughout the several views, and more particularly to FIG. 1 thereof, the apparatus for reproducing video information according to the present invention is shown in a block diagram as including a recording medium 10. The recording medium 10 is provided with reels 12 and 14 for supplying and taking up the recording medium 10. A conventional pinch roller 16 and a capstan device 18 are provided for enabling the recording medium 10 to move at a constant velocity Vf along a direction of motion L as shown by the direction of the arrow in FIG. 1.

Figure 2:
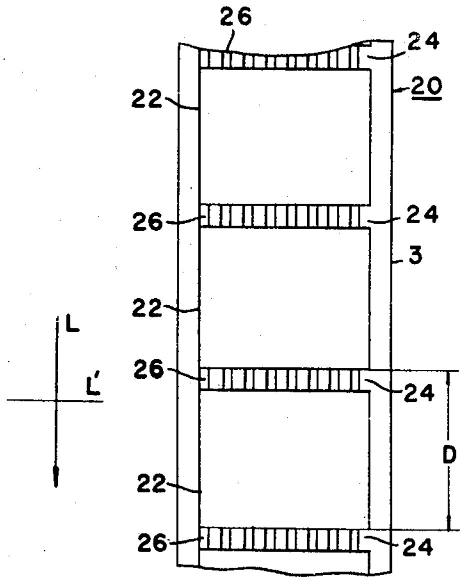
FIG. 2 is an enlarged view of a segment of optical film used in the apparatus of FIG. 1.

An optical film 20 may be employed as the recording medium 10, and an enlarged portion of such a film is shown in FIG. 2. In FIG. 2, L again designates the direction of motion. The optical film 20 may be in the shape of a belt or web oriented along the moving line L, and having video information areas or frames 22 along the line L. In the embodiment shown in the Drawing, the video information areas or frames 22 are rectangular in shape, and contain video information. Between each of the frames are spacing areas 24, which separate each of the frames 22 along the line L. Each of the spacing areas 24 is positioned between adjacent frames 22, and extends laterally along a line L' which traverses the line L at right angles. Each of the spacing areas 24 is provided with a number of synchronizing marks 26 aligned parallel with the line L' having a certain width and having intervals therebetween. The synchronizing marks 26 may be colored black, but colors other than black can be used. The synchronizing marks 26 are formed so as to produce a signal which is clearly different from the signal obtained by scanning the video information or frame area 22. It should be apparent that the shape and color of the synchronizing marks are not limited and that the synchronizing marks may be of various shapes and types. The dimension D of one field of the recording medium, which is measured along the line L of the recording medium 10 or the optical film 20, is shown in FIG. 2. The dimension D is the sum of the lengths of one of the video information areas and one of the spacing areas 24. The portion defined by the dimension D constitutes one field along the line L.

Recording media other than the optical film 20, for example, thermoplastic, may also be used. However, it must be understood that a video information area 22, a spacing area 24 and a synchronizing mark 26 are required with any kind of recording medium, as in the embodiment described aove.

Referring again to FIG. 1, a conventional flying spot scanning tube 30 is provided at one side of the recording medium 10 having a front face 32, which is disposed opposite to the recording medium 10. The flying spot scanning tube 30 includes an electron gun therein which is not shown in the Drawing, and a phosphor film (not shown)coated on the inner surface of the front face 32 which emits light upon receiving an electron beam from the electron gun. The flying spot scanning tube 30 also includes two deflecting elements which deflect the electron beam. A first deflecting element 34 is generally referred to as a horizontal deflecting element, which has been used in conventional apparatuses for reproducing video information. The deflecting element 34 deflects the electron beam along a first line L' which traverses or crosses the direction of motion line L at right angles, as shown in FIG. 2, and moves a luminous spot on the front surface 32 of the tube 30 along the line L'. A second deflecting element 36, which may be referred to as a vertical deflecting element, is specially provided according to this invention. The deflecting element 36 deflects the electron beam along a second line which is parallel to the direction of movement line L, as shown in FIG. 2, and makes the luminous spot on the front face 32 move parallel to the movement line L. The luminous spot on the front face 32 is generally referred to as a flying spot. Each of the deflecting elements 34 and 36 deflects the electron beam and the flying spot in proportion to voltages applied thereto, as is well known.

A voltage from a first deflecting circuit 38 is applied to the first deflecting element 34. In this deflecting circuit 38, a sawtooth voltage wave is generated and repeated, making the flying spot move along the first line L'. A voltage is applied to the second deflecting element 36 from an output terminal 42 of a second deflecting circuit 40. The second deflecting circuit 40 includes an input terminal 44. The second deflecting circuit 40 is specially provided according to this invention, and a detailed explanation of the circuit will be provided hereinafter.

A lens system 46 is positioned between the flying spot scanning tube 30 and the recording medium 10 for projecting the flying spot from the front face 32 of the flying spot scanning tube 30 onto the recording medium 10.

At the opposite side of the lens system 46 in relation to the recording medium 10, a photoelectric transducer 50 is provided for detecting the transmission of light from the flying spot which is projected through the recording medium 10, and for converting the same into an electrical signal proportional to the intensity of the transmitted light. The electrical signal from the photoelectric transducer 50 is applied to a TV monitor 54 after amplifying the same using an amplifying circuit 52. The TV monitor is used for reproducing the video information read from the output of the amplifying circuit 52, i.e., the information from the recording medium 10 in the form of an electrical signal. A standard TV receiver may be used for this purpose, for example.

In the standard TV receiver, the number of fields reproduced per second is limited to about 60 because of the problem of flicker in the reproduced video information.

A video reproduction subsystem including photoelectric transducer 50, amplifier direction and TV monitor 54 is denoted by the numeral 56.

A control system 58, which is not included in the video reproduction subsystem 56, is provided between the photoelectric transducer 50 and the second deflecting circuit 40, and includes a synchronizing mark separating circuit 60 and a synchronizing mark pulse circuit 62. The synchronizing mark separating circuit 60 is a kind of filter which separates the signals which are generated when the flying spot scans the synchronizing marks 26 of the optical film 20 from the output of photoelectric transducer 50. Since the signal which is generated when the synchronizing mark is scanned has a particular frequency depending upon the width of the synchronizing marks 26 and the interval between them, and the frequency of this signal is different from the signal which is generated when the flying spot scans the video information area 22 of the optical film 20, the synchronizing mark signal is easily separated by the separating circuit 60. The synchronizing mark pulse circuit 62 is a wave shaping circuit which generates a synchronizing mark pulse having a fixed time duration after receiving the output signal from the separating circuit 60. This synchronizing mark pulse is applied to the input terminal 44 of the second deflecting circuit 40 as described above.

Figure 3:
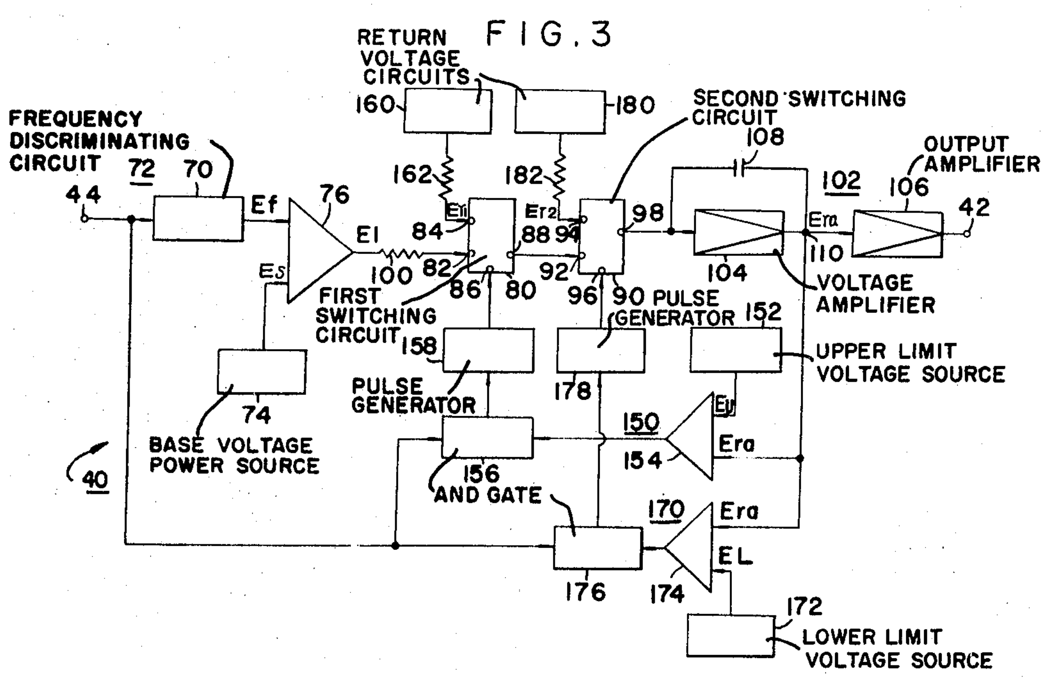
FIG. 3 is a detailed schematic diagram of a portion of the apparatus shown in FIG. 1.

Referring now to FIG. 3 in which a detailed schematic diagram of the second deflecting circuit 40 is shown, the deflecting circuit 40 includes a frequency discriminating circuit 70 connected to the input terminal 44. The frequency discriminating circuit 70 detects the synchronizing mark pulse applied to the input terminal, and generates a voltage E*f* which is proportional to the repetition frequency *f* of the synchronizing mark pulse. The voltage E*f* is proportional to the relative velocity V with respect to the moving velocity V*f* of the optical film 20 along the direction of motion line L and the moving velocity Vra of the flying spot along a line parallel to the movement line L. It is apparent from this information how many spacing areas 24 are scanned per unit time. It may be easily understood that the number of spacing areas 24 scanned per unit time will be increased if the relative velocity becomes higher, and vice versa. The voltage E*f* is referred to as a detecting signal, and the frequency discriminating circuit 70, along with the synchronizing mark pulse circuit 62 constitutes a detecting means 72 for generating the detecting signal E*f*.

The deflecting circuit 40 further includes a base voltage power source 74. The voltage of the output signal Es is determined by the number of field scans per second necessary to reproduce the video information without flicker on the TV monitor 54. As stated above, the standard TV receiver requires about 60 field scans per second (N*o*). Thus, the voltage is selected to meet the condition, N*o* = 60. Actually, the base signal is selected to be equal to the voltage appearing at the output terminal of the frequency discriminating circuit 70 under the condition that exists when no deflection voltage is applied to the second deflecting element 36, and the optical film 20 is moved at a speed corresponding to No information fields per second.

The detecting signal E*f* and the base signal E*s* are compared by a comparing amplifier or device 76, which generates a signal representing the difference of these two signals. In the embodiment shown in the Drawing, the comparing device 76 is constructed as a comparison amplifier circuit which generates an amplified differential signal E1.

The deflecting circuit 40 also includes first and second switching circuits 80 and 90. The first switching circuit 80 has two input terminals 82 and 84, a control terminal 86 and an output terminal 88. The second switching circuit 90 also has two input terminals 92 and 94, a control terminal 96 and an output terminal 98. The switching circuit 80 controls the connections between the input terminal 82 and the output terminal 88, and connections between the input terminal 84 and the output terminal 88 by the signal applied to the control terminal 86. When no signal is applied to the control terminal 86, the input terminal 82 and the output terminal 88 are connected, while the input terminal 84 and the output terminal 88 are disconnected. On the other hand, when a signal is applied to the control terminal 86, the circuit switches to the reverse condition. The switching circuit 90 is the same as switching circuit 80. The input terminal 92 and the output terminal 98 are connected, and the input terminal 94 and the output terminal 98 are disconnected when no signal is applied to the control terminal 96. On the other hand, when a signal is applied to the control terminal 96, the circuit switches to the reverse condition. These switching circuits 80 and 90 may be made of a pair of switching elements, such as transistors, for example, which are switched by the respective control signals.

The input terminal 82 of the first switching circuit 80 is connected to the output terminal of comparison amplifier 76 by means of a resistor 100, through which it receives the differential signal E1, described above. The input terminal 92 of the second switching circuit 90 is directly connected to the output terminal 88 of the first switching circuit 80.

The deflecting circuit 40 has a deflecting output circuit 102 including a voltage amplifier 104, an output amplifier 106, and a condenser or capacitor 108 connected across amplifier 104. The input terminal of the amplifier 104 is directly connected to the output terminal 98 of the second switching circuit 90, and the output terminal of amplifier 104 is in turn connected directly to an intermediate output terminal 110. The input terminal of amplifier 106 is directly connected to the intermediate output terminal 110 and the output terminal of amplifier 106 is in turn connected directly to the output terminal 42.

Through the switching circuits 80 and 90, the amplifier circuit 104 and the condenser 108 receive the differential signal E1, and operate so as to produce an output signal Era which is proportional to the differential signal E1 but altered in time, when the circuit between the input terminal 82 and the output terminal 88 of switching circuit 80 and the circuit between input terminal 92 and the output terminal 98 of switching circuit 90 are both in a conductive conditions. This operation will be discussed in detail later.

However, it should be noted that the output signal Era at the intermediate output terminal 110 varies according to the polarity of the differential signal E1. When the detecting signal E*f* is smaller than the base signal E*s*, the output signal Era recesses with time in proportion to the differential signal.

On the other hand, when the detecting signal E*f* is larger than the base signal E*s*, the output signal Era decreases with time in proportion to the differential signal. When the output signal E*ra* increases, it is required to return below an upper limit value E*u*. Similarly, when the output signal E*ra* decreases, it is required to return above a lower limit value EL, for the following reasons. The flying spot is deflected in one direction in proportion to the output voltage E*ra*. However, if the voltage E*ra* is above the upper limit value E*u* or below the lower limit value EL, the flying spot is deflected beyond the edges of the tube face 32 and loses the function of a flying spot, or else the flying spot deviates from the focusing range of the lens 46, consequently stopping the scanning operation.

In order to eliminate these disadvantages, the deflecting circuit 40 is further provided with a first and a second returning device 150 and 170. The first returning device 150 returns the voltage E*ra* below the upper limit value E*u*, when the voltage E*ra* exceeds the upper limit value, and includes an upper limit voltage source 152 to set up the upper limit value E*u*, a comparison circuit 154, an AND gate 156, a pulse generating circuit 158, a returning voltage source 160 and a resistor 162. The comparison circuit 154 compares the upper limit voltage E*u* from the source 152 with the output voltage E*ra* from the intermediate output terminal 110, and generates a certain output voltage (a first signal)

in case the output voltage E*ra* is higher than the voltage E*u*. AND gate 156 receives both the first signal from the comparison circuit 154, and the synchronizing mark pulse (a second signal) from the input terminal 44, and generates a certain output voltage when these first and second signals exist simultaneously. The pulse generating circuit 158 generates a pulse a certain interval after receiving the output voltage from AND gate 156. The duration of this pulse is made short relative to the time required for scanning one field of the optical film 20 along a line which is parallel to the movement line of the optical film 20. The output pulse of the pulse generating circuit 158 is applied to the control terminal 86 of the first switching circuit 80. The input terminal 82 and the output terminal 88 are disconnected, and the input terminal 84 and the output terminal 88 are connected for a period corresponding to the duration of the output pulse. The returning voltage source 160 applies a returning voltage E*r*1 to the input terminal 84 of the first switching circuit 80 by means of a resistor 162. The returning voltage E*r*1 decreases the output voltage E*ra* of the intermediate output terminal 110 to a certain value, and makes the voltage E*ra* drop below the upper limit value E*u*.

The second returning device 170, which maintains the voltage Era above the lower limit value EL, includes a lower limit voltage source 172, a comparison circuit 174, an AND gate 176, a pulse generating circuit 178, a returning voltage source 180, and a resistor 182. The comparison circuit 174 compares the lower limit voltage EL with the output voltage E*ra* from the intermediate output terminal 110, and generates a certain output voltage (a first signal) in case the output voltage E*ra* is lower than the voltage EL. AND gate 176 receives both the first signal from the comparison circuit 174 and the synchronizing mark pulse (a second signal) from the input terminal 44, and generates a certain output voltage when these first and second signals exist simultaneously. The pulse generating circuit 178 generates a pulse a certain interval after receiving the output voltage from AND gate 176. The duration of this pulse is made short relative to the time required for scanning one field of the optical film 20 along a line which is parallel to the movement line of the optical film. The output pulse from the pulse generating circuit 178 is applied to the control terminal 96 of the second switching circuit 90. The input terminal 92 and the output terminal 98 are disconnected, and the input terminal 94 and the output terminal 98 are connected during the duration of the pulse. The returning voltage source 180 applies a returning voltage E*r*2 to the input terminal 94 of the second switching circuit 90 by means of a resistor 182. The returning voltage E*r*2 increases the output voltage E*ra* of the intermediate output terminal 110 to a value above the lower limit value EL.

The first returning device 150 operates if the optical film 20 is moved below the scanning velocity which is usually required per second, as, for example, in slow motion reproduction. On the other hand, the second returning device 170 operates if the optical film is moved faster than the usual scanning velocity, as, for example, in quick or accelerated motion reproduction. The operation of the returning devices 150 and 170 will be described in detail hereinafter.

The operation of the apparatus constructed as described above will now be described in general, in connection with FIGS. 4, 5, and 6.

Figure 4:
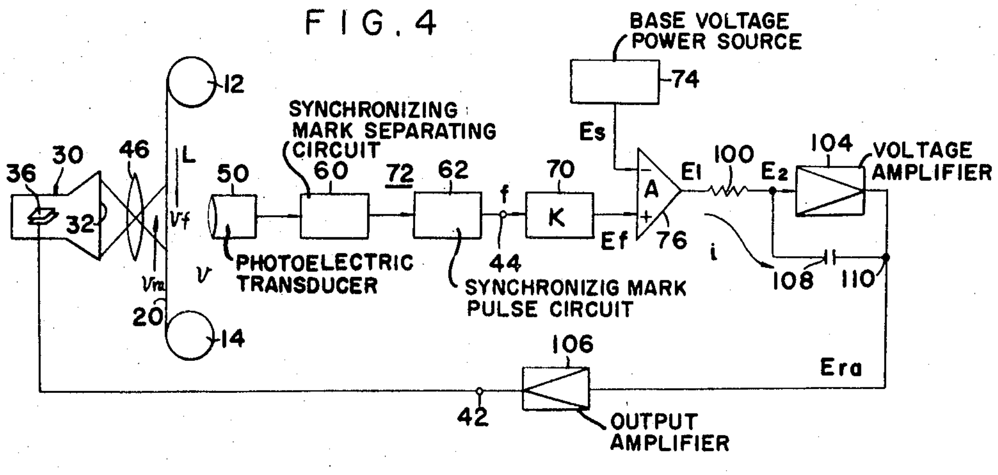
FIG. 4 is a block diagram illustrating the vertical scanning signal flow through the apparatus of FIG. 1.

FIG. 4 indicates the flow of the vertical scanning signal which deflects the flying spot along a line parallel to the movement line when no output pulses from the pulse generating circuit 158 and 178 are applied to the first and second switching circuits 80 and 90, and the output pulse of the comparing device 76 is applied to the input terminal of the voltage amplification circuit 104. V*ra* indicates the moving velocity of the luminous spot on the optical film 20, which moves in a vertical direction parallel to the movement line L of the optical film. V indicates the relative velocity of the luminous spot V*ra* and the moving velocity V*f* of the optical film 20. K indicates a constant for transforming the repetition frequency of the synchronizing mark pulse *f* to the detecting voltage E*f* by the frequency discriminating circuit 70. "A" indicates the amplification of the comparing amplifier 76. E1, E2 and E*ra* indicate respectively the differential output of the comparing amplifier 76, the input voltage of the voltage amplification circuit 104, and the output voltage of the intermediate output terminal 110. The current flowing through the resistor 100 and the condenser 108 is indicated by the letter *i*.

Figure 5:
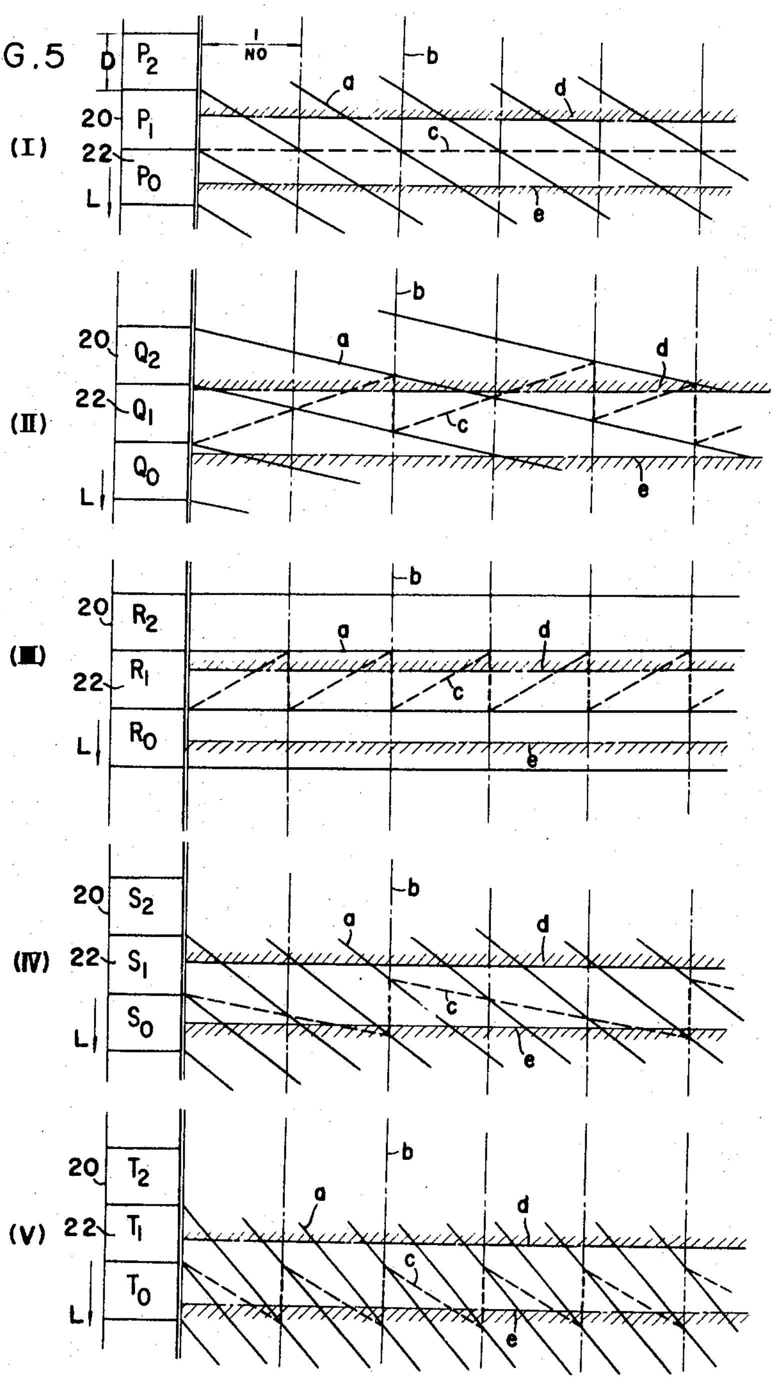
FIG. 5 is a five-part diagrammatic illustration of five different recording medium scanning rates; and, FIG. 6 is a six-part graphical illustration of voltage waveforms at various positions in the circuit of FIG. 1.

FIG. 5 indicates the periodic change in the relationship between the optical film 20 as it is driven by the pinch roller 16 and the capstan device 18 and the luminous vertical scanning spot driven by the vertical scanning circuit 40 and projected on the film 20.

In FIG. 5, it should be understood that time is shown on the abscissa axis and the position along the optical film 20 is shown on the ordinate axis. In this Figure, the numerals (I), (II), (III), (IV), and (V) indicate the periodic change when the moving velocity Vf of the optical film 20 is changed. The optical film 20 on which the video information is recorded is shown by the arrow as travelling downward along the moving line L in the direction of $P_0$, $P_1$, $P_2$ - - - $Q_0$, $Q_1$, $Q_2$ - - - $R_0$, $R_1$, $R_2$ - - - $S_0$, $S_1$, $S_2$ - - - and $T_0$, $T_1$, $T_2$. A typical point on the optical film, such as the right edge of each of the video information areas 22, will move along as shown by the solid lines "*a*" with respect to time. Accordingly, the solid lines "*a*" show the moving position of the film for each point in time. Vertical lines "*b*" show points of coincidence in time. The broken lines "*c*" show the position of the scanning spot as it moves in a vertical direction. Horizontal lines "*d*" and "*e*" show the output voltage Eu of the upper limit voltage source 152 and the output voltage EL of the lower limit voltage source 172 respectively in relation to the position of the scanning spot. It should be understood that in order to simplify the Drawings, the synchronizing marks 26 are not separately shown, but are taken as being included in the video information portions P, Q, R, S and T of film 20.

Figure 6:
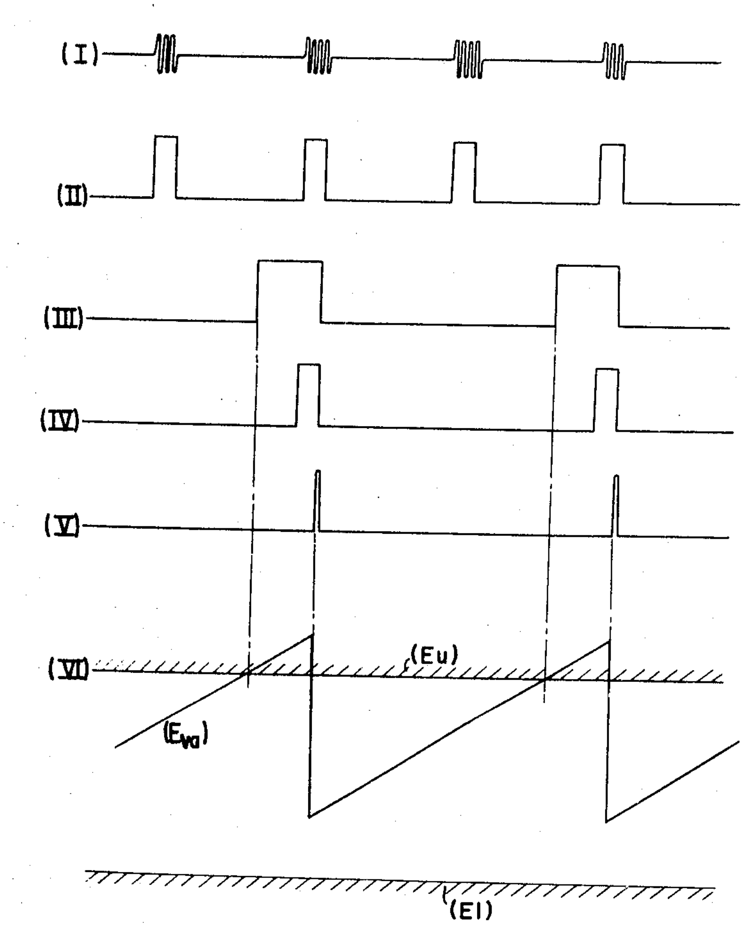

FIG. 6 shows a plurality of typical waveform diagrams for various locations in the embodiment described above with respect to the periodic change. In this Figure, diagram (I) shows the synchronizing mark signal obtained by the synchronizing mark separating circuit 60, which will have a certain frequency every time the flying spot scans each of the space areas 24. Diagram (II) shows the synchronizing mark pulse obtained by the synchronizing mark pulse circuit 62, which will have a certain pulse width due to the synchronizing mark signals. The synchronizing mark pulse will be generated having a repetition frequency f which is proportional to the velocity V which is the relative velocity of the optical film 20 V*f* with respect to the velocity V*ra* of the flying or scanning spot. Diagram (VI) shows the output voltage E*ra* appearing at the intermediate output terminal 110, together with the upper limit voltage E*u* and the lower limit voltage EL. Diagram (III) shows the output signal (the first signal) of the comparing circuit 154 in the first returning device 150. Diagram (IV) shows the output signal of AND gate 156. Diagram (V) shows the output pulse of the pulse generating circuit 158.

The operation of the apparatus of the present invention will now be described. The luminous spot of the flying spot scanning tube 30 is projected on the optical film 20 and makes several horizontal scannings of the synchronizing mark areas 26 of the optical film 20. Successive synchronizing mark signals having a certain frequency are then generated at the output terminal of the photoelectric transducer 50. The successive synchronizing mark signals are separated by the synchronizing mark separating circuit 60, and thus the waveform shown in FIG. 6(I) is obtained. The synchronizing mark signal is shaped by the synchronizing mark pulse to a certain pulse width by the synchronizing mark pulse circuit 62, then the waveform shown in FIG. 6(II) is obtained.

If the luminous spot of the flying spot scanning tube 30 projected on the optical film 20 is driven in a vertical scan at the velocity Vra as shown in FIG. 4, the relative speed V between the optical film 20 and the luminous spot is represented by the following equation:

$$V = Vra + Vf \tag{6}$$

Thus, the number of video information areas 22 vertically scanned by the luminous spot per second is $V/D$, which coincides with the number of synchronizing mark portions 26 scanned per second, and the repetition frequency of the synchronizing mark pulse $f$ is represented by the following equation:

$$f = V/D \tag{7}$$

The relationship among the various signals shown in FIG. 4 will be explained by the following equations:

$$Ef = K \times f \tag{8}$$

$$E_1 = A\ (Ef - Es) \tag{9}$$

The circuit comprising the resistor 100, the voltage amplification circuit 104, and condenser 108 has an integrating characteristic with respect to its time constant $T_1$ which is determined by the resistance $R_1$ of resistor 100 and the capacitance C of the condenser 108. If the input impedance of the voltage amplification circuit 104 is greater than the impedance of the condenser 108, the following equations will be obtained:

$$i = E_1 - E_2/R_1 \tag{10}$$

$$Era = -\ 1/C \int idt + E_2 \tag{11}$$

In the above equations, if the gain of the voltage amplification circuit 104 is large enough, $E_2$ is approximately zero, and the following equation is obtained:

$$Era = -\ A/CR_1 \int (Ef - Es)\ dt$$
$$Era = A/T_1\ (Es - Ef)\ t \tag{12}$$

This equation defines a signal waveform increasing with a constant slope represented by the following equation:

$$U = A/T_1\ (Es - Ef) \tag{13}$$

If the luminous spot on the front face 32 of the flying spot scanning tube 30 is driven in a vertical scan by the voltage shown in the equation (12), the moving velocity Vra of the luminous spot on the optical film 20 projected and focused by the lens system 46 will be represented by the following equation:

$$Vra = k \cdot U \tag{14}$$

In this equation, $k$ is the constant determined by the amplification of the output circuit 106, the deflecting sensitivity of the flying spot scanner, and the multiplying factor of the lens system 46.

The repetition frequency $f$ will now be obtained from these formulas, considering the formulas (6), (7), and (8):

$$Ef = K/D\ (Vra + Vf) \tag{15}$$

Equation (15) is substituted into equation (13):

$$U = A/T_1\ [Es - K/D\ (Vra + Vf)] \tag{16}$$

Equation (16) is substituted into equation (14):

$$Vra = ka/T_1\ [Es - K/D\ (VrA + Vf)\ ]$$

*Vra* is then given by the following equation:

$$Vra = \frac{\frac{k}{T_1} Es - \frac{kK}{DT_1} Vf}{\frac{1}{A} + \frac{kK}{DT_1}} \tag{17}$$

If the amplification of the comparing amplifier 76 is large enough, and the following equation applies:

$$1/A << kK/DT_1 \tag{18}$$

Equation (17) is transformed as follows:

$$Vra = D/K\ Es - Vf \tag{19}$$

The relative velocity is obtained by substituting equation (19) into equation (6) as follows:

$$V = D/K\ Es \tag{20}$$

Therefore, the repetition frequency f of the synchronizing mark pulse is obtained from the equation (7) as follows:

$$f = Es/K \tag{21}$$

Assuming that Es is KNo, the following equation is obtained:

$$f = No \quad (22)$$

Therefore, the repetition frequency $f$ of the reproduced video information is always kept at a constant value (N$o$) by selecting E$s$ as KN$o$, regardless of the moving velocity V$f$ of the optical film. The vertical velocity V$ra$ of the luminous spot on the optical film 20 in this case is obtained by substituting equation (19 ) into equations (21) and (22) as follows:

$$Vra = NoD - Vf \quad (23)$$

According to the present invention, the vertical scanning velocity Vra is changed in accordance with the moving velocity of the optical film 20, and the repetition frequency $f$ of the reproduced video information is kept constant by keeping the relative velocity V between the vertical velocity V$ra$ and the velocity V$f$ constant.

If the luminous spot on the optical film 20 is kept moving at the velocity V$ra$ as explained above, the luminous spot will move laterally beyond the lens 46 or the front face 32. Thus, the luminous spot must be returned to the lens or face area in an appropriate time, as will be explained hereinafter.

An explanation will now be made of slow motion and still motion reproduction wherein the moving velcoity V$f$ of the optical film 20 is smaller than the standard velocity (N$o$D) shown in the equation (5) and illustrated in FIG. 5 (II) and (III). In this case, $0 \leqq Vf < NoD$, therefore $NoD \geqq Vra > 0$, as obtained from equation (23). Accordingly, the luminous spot on the optical film 20 is moved in a direction opposite to the direction of the optical film 20.

If E$u$ is selected so that when the voltage E$ra$ of the output terminal 110 is equal to E$u$, the scanning spot is positioned on the optical film 20 at a distance of about D/2 from the center of the optical system, the pulse waveform as shown in FIG. 6(IV) is generated at the output terminal of the comparing circuit 154 when the luminous spot passes the position described above. Consequently the voltage E$ra$ of the output terminal 110 is greater than the ouput voltage E$u$ of the upper limit voltage source 152. This pulse and the synchronizing mark pulse applied to the input terminal 44 are added together in AND gate 156, resulting in the pulse shown in FIG. 6 (IV) being generated at the output terminal. This pulse is delayed and narrowed in width in the pulse generating circuit 158, and the pulse shown in FIG. 6(V) is generated. The first switching circuit 80 is actuated by the pulse, and the output voltage E$r_1$ of the returning voltage source 160 appears at the output terminal through the resistor 162. In this case, the output votlage E$r_1$ of the returning voltage source 160 and the resistance $R_2$ of the resistor 162 are selected properly so that the luminous spot on the optical film 20 makes a fly-back scan for a distance D as illustrated at "$c$" of FIG. 5(II) and (III) in the direction of movement of the optical film 20. In this case, the time constant of the integration circuit is $T_2=R_2C$. Thus, the video information area 22 of the optical film 20 is scanned vertically and can be reproduced correctly.

Now, an explanation will be made as to rapid or accelerated motion reproduction wherein the moving velocity V$f$ of the optical film 20 is faster than the standard velocity (NoD), for example, wherein the moving velocity V$f$ of the optical film is two times of the standard velocity, which is shown in equation (5) and illustrated in FIG. 5 (IV) and (V). In this case, $NoD < Vf \leqq NoD$, therefore, $0 > Vra \geqq -NoD$ is obtained from equation (23). Accordingly, the luminous spot on the optical film 20 is moved in the same direction as the optical film.

If EL is selected so that the position of the luminous spot is far from the center of the optical film 20 (i.e., a position opposite that corresponding to Eu described above) when the voltage E$ra$ of the output terminal 110 is euqal to EL, and the distance between the position of the luminous spot corresponding to EL and the position corresponding to Eu is greater than the diameter of the screen 32, a pulse is generated at the output terminal of the comparative circuit 174 when the luminous spot passes the position described above, and consequently the voltage E$ra$ of the output terminal 110 is lower than the output voltage EL. AND gate 176 operates when the pulse and the synchronizing mark pulse exist simultaneously, and a pulse having narrow width is generated at the output terminal of the pulse generating circuit 178. The second switching circuit 90 is actuated by the pulse, and the output voltage E$r_2$ of the returning voltage source 180 appears at the output terminal through the resistor 182. The output voltage E$r_2$ of the returning voltage source 180 and the resistance $R_3$ of the resistor 182 are selected properly so that the luminous spot on the optical film 20 makes a fly-back scan a distance D as shown by "$c$" of FIG. 5 (IV) and (V) in a direction opposite to that of the optical film 20. In this case, the time constant of the integration circuit is $T_3 = R_3C$. Thus, the video information area 22 of the optical film 20 is scanned vertically and can be reproduced correctly. It is necessary that the interval between the position of the luminous spot corresponding to the output voltage E$u$ of the upper voltage source 152 ("$d$" in FIG. 5) and the position of the luminous spot corresponding to the output voltage EL of the lower voltage source 172 ("$e$" in FIG. 5) is somewhat larger than the size D of the information field.

If the interval is smaller than D, the video information area 22 of the optical film 20 can not be reproduced properly because of oscillatory fly-back before the scanning is complete. It should be understood that the return distance of the luminous spot by the returning voltage source 160 is not limited to D, but it may be integral multiple of D.

FIG. 5 (I) shows that the moving velocity V$f$ of the optical film 20 coincides with the standard velocity (N$o$D) shown in equation (5). In this case, it is apparent that the luminous spot does not move in the same direction as the optical film 20.

Although a particular embodiment has been illustrated, the synchronizing mark may also indicate that the luminous spot scanning the recording medium is located on the area dividing one video information portion from the next. Accordingly, it should be understood that the detecting method is not limited by the method shown in the present invention.

The distance between the location of the luminous spot corresponding to the output voltage E$u$ of the upper limit voltage source 152 and the location of the luminous spot corresponding to the output voltage EL of the lower voltage source 172 may be greater than the distance to be returned by the fly-back scanning. For example, it may be an integral multiple of D, i.e., 2D, 3D - - - . In this case, operations such as reverse motion reproduction and quick or accelerated motion reproduction may be carried out at three times the standard velocity (NoD). The top of the vodeo information area 22 of the optical film illustrated herein is oriented toward the moving direction of the optical film as shown in FIG. 5. However, when its bottom is oriented toward the moving direction of the optical film, the video information may still be reproduced in a proper orientation, because the direction of the relative velocity may be inverted by an inversion of the polarity of the comparative amplification circuit 76. In order to indicate the relative speed of this modification as a positive number, the equation (6) may be rewritten as follows:

$$V' = -(Vra + Vf) \quad (6')$$

and calculated as explained before. Then the repetition frequency $f$ of the reproduction of video information will be exactly the same value as in equations (20) and (21). However, the velocity $Vra'$ of the luminous spot will be represented by the following formula:

$$Vra' = -(NoD + Vf) \quad (23')$$

and it will differ from the velocity $Vra$ by $-2NoD$. In this case, if the distance between the position of the luminous spot corresponding to the output voltage of the upper limit voltage source and the position of the luminous spot corresponding to the output voltage of the lower limit voltage source is wider than twice the size of the screen, and the return distance of the luminous spot by the fly-back scanning is 2D, a variety of reproducing techniques can be used, including reproduction at the standard velocity, and reverse motion reproduction.

In the reproducing of the video information as described above, the recording medium 10 generally moves at a different speed from the standard velocity which is determined by the number of information fields (No) per second required in the TV monitor 54, for example (No = 60). In this case, the number of recorded fields on the recording medium is assumed to be 10 per second, to coincide with the number of fields (No) reproduced per second as required in the TV monitor 54. Under this assumption, it has been disclosed that the required number of fields reproduced per second for stable reproduction of video information can be obtained in the TV monitor 54, even if the recording medium 10 moves at a speed different from the standard velocity. However, it should be understood that even if the recording medium 10 is constructed so that the number of fields recorded per second is different from the number of fields reproduced per second as required by the TV monitor 54, it is possible to reproduce the number of fields per second required in the TV monitor. For example, it is possible to reproduce clearly information recorded at only one-half or one-third of the required number of fields per second. It is advantageous to decrease the number of fields recorded on the recording medium 10 per second rather than to decrease the number of fields reproduced in the TV monitor per second, because this permits reduction of the length of the recording medium. From the above description, it will be readily understood that a reproducing operation which maintains the number of fields reproduced per second at No is possible using a recording medium 10 having a different number of fields recorded per second from the reproducing field number No.

It should be understood that the apparatus described above can be used to reproduce recording media having different field numbers recorded per second from recording media having a given number of fields recorded per second. In this case, the recording device is equipped to receive the output signal of the amplifying circuit 52 in the above apparatus. Since the number of fields scanned per second depends on the base signal Es of the base voltage power source 74, information corresponding to the required number of field scans can be applied to the recording device by setting the base signal Es at a certain value. Thus, a recording medium having the required number of fields recorded per second will be obtained.

As explained above, according to the present invention, the repetition frequency of the video information to be reproduced on a TV monitor can be kept at a constant value regardless of the velocity of the continuously moving recording medium.

Obviously, many modifications and variations of the present invention are possible in light of the above teachings. It is therefore to be understood that within the scope of the appended Claims, the invention may be practiced otherwise than as specifically described herein.

What is claimed as new and desired to be secured by letters patent of the United States is:

1. An apparatus for reproducing video information comprising:

a recording medium continuously moving in a first direction, said recording medium including a plurality of video information storage areas and a plurality of spacing areas separating said video information storage areas;

first means for deflecting a flying spot in a second direction for scanning said recording medium transversely with respect to said first direction at a horizontal frequency, second means for deflecting said flying spot in a direction substantially parallel to said first direction, detecting means for generating a first signal the level of which is proportional to the relative velocity of said recording medium with respect to the velocity of said flying spot in said first direction, signal generating means for generating a reference signal having a constant level which is preset depending upon the number of field scans per second required to reproduce said video information substantially without flicker on a TV monitor, comparing means for generating a second signal representing the difference between said first signal and said reference signal, output means for controlling said second means in accordance with said second signal whereby said flying spot is deflected at a velocity which tends to minimize said second signal; and, means for returning said flying spot to a limited area in response to an indication that said flying spot has been deflected beyond said limited area.

2. An apparatus for reproducing video information as in claim 1, wherein:

said first signal is generated by a means for scanning said spacing areas.

3. An apparatus for reproducing video information as in claim 1, wherein:
said spacing areas each include a synchronizing means.

4. An apparatus for reproducing video information as in claim 3, wherein:
said synchronizing means includes a plurality of marks aligned transverse to said first direction.

5. An apparatus for reproducing video information as in claim 1, wherein:
said returning means includes
first returning emans for returning said flying spot to said limited area when said flying spot is deflected beyond said limited area in said first direction; and,
second returning means for returning said flying spot to said limited area when said flying spot is deflected beyond said limited area in a direction opposite said one direction.

6. An apparatus for reproducing video information as in claim 1 wherein:
said returning means includes means for returning said flying spot to said limited area when said flying spot is deflected in said first direction to such an extent that one of said spacing areas is scanned.

7. An apparatus for reproducing video information as in claim 6, wherein:
said returning means includes means for returning said spot a distance equal to an integer times the sum of one dimension of one of said information storage areas and one dimension of one of said spacing areas.

8. An apparatus for reproducing video information as in claim 1, wherein:
said output means includes means for generating an output signal which varies in proportion to the time integral of said second signal thereby deflecting said flying spot in said first direction at a velocity which tends to minimize said second signal when said output signal is applied to said second means.

9. An apparatus for reproducing video information as in claim 8, wherein:
said returning means includes
a signal generator actuated when said output signal exceeds a predetermined amplitude for returning said flying spot a distance determined by the value of the signal generated by said signal generator.

10. An apparatus for reproducing video information as in claim 8, wherein:
said returning means includes means for returning said flying spot a certain distance when said flying spot is deflected a sufficient amount in said first direction to scan one of said spacing areas.

11. An apparatus for reproducing video information as in claim 8, wherein:
said returning means includes means for returning said flying spot a certain distance equal to an integer times the sum of one dimension of one of said information storage areas and one dimension of one of said spacing areas.

12. An apparatus for reproducing video information as in claim 8, wherein:
said returning means includes
first returning means for returning said flying spot to said limited area when said flying spot is deflected beyond said limited area in said first direction; and,
second returning means for returning said flying spot to said limited area when said flying spot is deflected beyond said limited area in a direction opposite said one direction.

13. An apparatus for reproducing video information as in claim 12, wherein:
each of said returning means includes
a signal generator actuated when said output signal exceeds a predetermined amplitude for returning said flying spot a distance determined by the value of the signal generated by said signal generator.

14. An apparatus for reproducing video information as in claim 12, wherein:
each of said returning means includes means for returning said flying spot a certain distance when said flying spot is deflected to scan one of said spacing areas.

15. An apparatus for reproducing video information as in claim 12, wherein:
each of said returning means includes means for returning said flying spot a certain distance equal to an integer times the sum of one dimension of one of said information areas and one dimension of one of said spacing areas.

16. An apparatus for reproducing video information comprising:
a recording medium continuously moving in a first direction, said recording medium including a plurality of video infomation storage areas and a plurality of spacing areas separating said video information storage areas;
first means for deflecting a flying spot in a second direcion for scanning said recording medium transversely with respect to said first direction,
second means for deflecting said flying spot in a direction substantially parallel to said first direction,
detecting means for generating a first signal which is proportional to the relative velocity of said recording medium with respect to the velocity of said flying spot in said first direction,
comparing means for generating a second signal representing the difference between said first signal and a reference signal;
output means for controlling said second means in accordance with said second signal whereby said flying spot is deflected at a velocity which tends to minimize said second signal; and
means for returning said flying spot to a limited area in response to an indication that said flying spot has been deflected beyond said limited area, wherein said returning means includes means for generating a third signal when said flying spot is deflected beyond said limited area in said first direction, means for generating a fourth signal when said flying spot scans one of said spacing areas; and, AND gate means for returning said flying spot a predetermined distance upon simultaneously receiving said third and fourth signals.

17. An apparatus for reproducing video information comprising:
a recording medium continuously moving in a first direction, said recording medium including a plurality of video information storage areas and a plurality of spacing areas separating said video information storage areas;
first means for deflecting a flying spot in a second direction for scanning said recording medium transversely with respect to said first direction,
second means for deflecting said flying spot in a direction substantially parallel to said first direction,
detecting means for generating a first signal which is proporational to the relative velocity of said recording medium with respect to the velocity of said flying spot in said first direction,
comparing means for generating a second signal representing the difference between said first signal and a reference signal,
output means for controlling said second means in accordance with said second signal whereby said flying spot is deflected at a velocity which tends to minimize said second signal, wherein said output means includes means for generating an output signal which varies periodically in proportion to said second signal thereby deflecting said flying spot in said first direction at a velocity which tends to minimize said second signal when said output signal is applied to said second means;
means for returning said flying spot to a limited area when said flying spot is deflected beyong said limited area, wherein said returning means returns said flying spot a certain distance when said flying spot is deflected a sufficient amount in said first direction to scan one of said spacing areas and wherein, said returning means includes means for generating a third signal when said flying spot is deflected beyond said limited area in said first direction; means for generating a fourth signal when said flying spot scans one of said spacing areas; and, AND gate means for returning said flying spot a predetermined distance upon simultaneously receiving said third and fourth signals.

18. An apparatus for reproducing video information comprising:
a recording medium continuously moving in a first direction, said recording medium including a plurality of video information storage areas and a plurality of spacing areas separating said video information storage areas;
first means for deflecting a flying spot in a second direction for scanning said recording medium transversely with respect to said first direction,
second means for deflecting said flying spot in a direction substantially parallel to said first direction,
detecting means for generating a first signal which is proportional to the relative velocity of said recording medium with respect to the velocity of said flying spot in said first direction,
comparing means for generating a second signal representing the difference between said first signal and a reference signal.
output means for controlling said second means in accordance with said second signal whereby said flying spot is deflected at a velocity which tends to minimize said second signal, wherein said output means includes means for generating an output signal which varies periodically in proportion to said second signal thereby deflecting said flying spot in said first direction at a velocity which tends to minimize said second signal when said output signal is applied to said second means;
means for returning said flying spot to a limited area when said flying spot is deflected beyond said limited area, wherein said returning means includes first returning means for returning said flying spot to said limited area when said flying spot is deflected beyond said limited area in said first direction and;
second returning means for returning said flying spot to said limited area when said flying spot is deflected beyond said limited area in a direction opposite said one direction;
each of said returning means including means for returning said flying spot a certain distance when said flying spot is deflected to scan one of said spacing areas; and,
each of said returning means further including means for generating a third signal when said output signal exceeds a predetermined value, means for generating a fourth signal when said flying spot scans one of said spacing areas and,
AND gate means for returning said flying spot a predetermined distance upon simultaneously receiving said third and fourth signals.

* * * * *